Patented Aug. 21, 1951

2,565,338

UNITED STATES PATENT OFFICE 2,565,338

GERMANIUM CRYSTALS

Salvatore F. Amico, East Boston, Mass., assignor to Sylvania Electric Products Inc., Salem, Mass., a corporation of Massachusetts No Drawing. Application July 16, 1948, Serial No. 39,199

3 Claims. (Cl. 75—134)

This invention relates to semi-conductors such as germanium crystals, and particularly to the preparation of such crystals.

I find that the addition of a small amount of germanium dioxide to the germanium metal permits the use of a less pure germanium starting material, and thereby greatly reduces the cost of manufacturing, while improving the electrical characteristics of the resultant crystal.

Other objects, features and advantages of the invention will be apparent from the following specification.

In making a germanium crystal suitable for rectification, oscillation, amplification and the like I may take germanium dioxide in the form of a fine white powder and reduce it in an atmosphere of hydrogen at a temperature of about 700° C. for several hours, for example, three hours to give a fine black powdered germanium metal. This may be placed in a quartz crucible, together with about 1% of metallic tin in the form of particles which may for example be such as would pass through a thirty-mesh screen. About 0.1% germanium dioxide in finely powdered form is added to these components, and made into a homogeneous mixture therewith, for example, by rolling them together on a sheet of paper. The germanium dioxide should be less than about 0.2%, about 0.1% giving the best results. The amount of tin may be varied, for example, from about 0.2% to about 4%, but 1% is the preferable proportion.

The powdered mixture of germanium, tin and germanium dioxide, is heated to about 1000° C. and cooled slowly to the freezing point of the resultant melt. About fifty minutes may be allowed to elapse while the melt is being cooled from 1000° C. to its freezing point, and the temperature may be held at the freezing point for about ten minutes after which the heat may be removed and the material allowed to cool to room temperature in the absence of any heat supplied to the material. The crystal may then be used in a device for example, as shown in my co-pending application Serial 749,471, filed May 21, 1947, for an "Electronic Rectifying Unit,"

now abandoned, or as in a co-pending application of et Casellini, Serial 492,163, filed June 23, 1943, for "Electrical Rectifiers," or in some other convenient manner.

The exact function of the germanium dioxide in the melt is not definitely known, but its use permits manufacture from inferior and somewhat impure germanium materials of crystals with extremely good electrical characteristics for rectification, oscillation, amplification and the like.

The addition of some activating impurity such as tin is generally necessary to make good germanium crystals for use as semiconductors: however, other materials than tin may be used.

What I claim is:

1. The method of making semi-conductive germanium including the step of melting purified pulverulent germanium together with about 0.1% of pulverulent germanium dioxide in contact with an activating impurity.

2. A semiconductive ingot made by melting purified pulverulent germanium together with about 0.1% of pulverulent germanium dioxide in contact with an activating impurity.

3. The method of making semiconductive germanium, including the steps of mixing together purified pulverulent germanium together with about .1% of pulverulent germanium dioxide and .2% in 4% tin, melting this mixture, and slowly allowing the mixture to cool.

SALVATORE F. AMICO.

REFERENCES CITED

The following references are of record in the file of this patent:

"Chemical Abstracts," vol. 33 (1939), page 6694.

"Crystal Rectifiers," by Torrey and Whitmer, published by McGraw-Hill, 1948, pages 308 and 313.

Journal of the American Chemical Society, vol. 52 (1930), page 5161.

Transactions of the American Electrochemical Society, vol. 89 (1946), page 279.